United States Patent [19]
Sasamoto et al.

[11] Patent Number: 5,912,969
[45] Date of Patent: Jun. 15, 1999

[54] INFORMATION RECEIVING AND RECORDING/REPRODUCING APPARATUS/METHOD HAVING FUNCTION FOR LIMITING/DELIMITING FOR PROTECTING COPYRIGHT OF RECORDING INFORMATION

[75] Inventors: Manabu Sasamoto; Nobutaka Amada; Takao Arai; Takaharu Noguchi; Hitoaki Owashi, all of Yokohama; Hideo Nishijima, Hitachinaka; Hiroaki Ono, Fujisawa; Hiroo Okamoto, Yokohama, all of Japan

[73] Assignee: Hitachi, Ltd., Tokyo, Japan

[21] Appl. No.: 08/993,190

[22] Filed: Dec. 18, 1997

Related U.S. Application Data

[63] Continuation of application No. 08/413,429, Mar. 30, 1995, abandoned.

[30] Foreign Application Priority Data

Mar. 31, 1994 [JP] Japan .................................... 6-063657

[51] Int. Cl.⁶ .............................. H04N 7/167; H04L 9/00
[52] U.S. Cl. .................................... 380/5; 380/4; 380/20; 360/60
[58] Field of Search ............................. 380/4, 5, 10, 20; 360/27, 60; 348/5.5

[56] References Cited

U.S. PATENT DOCUMENTS

| | | | |
|---|---|---|---|
| 3,963,865 | 6/1976 | Songer | 380/5 |
| 4,215,366 | 7/1980 | Davidson | 380/17 |
| 4,835,682 | 5/1989 | Kurachi et al. | 380/4 X |
| 4,866,769 | 9/1989 | Karp | 380/4 |
| 4,945,563 | 7/1990 | Horton et al. | 380/5 |
| 5,003,410 | 3/1991 | Endoh et al. | 360/60 |
| 5,046,090 | 9/1991 | Walker et al. | 380/5 |
| 5,172,241 | 12/1992 | Lee | 380/5 X |
| 5,418,852 | 5/1995 | Itami et al. | 380/4 |
| 5,579,391 | 11/1996 | Ihara | 380/15 |
| 5,588,058 | 12/1996 | Le Berre | 380/20 |

FOREIGN PATENT DOCUMENTS 464320  1/1992  European Pat. Off. .

*Primary Examiner*—Gail O. Hayes
*Assistant Examiner*—Pinchus M. Laufer
*Attorney, Agent, or Firm*—Antonelli, Terry, Stout & Kraus, LLP

[57] ABSTRACT

An apparatus comprising a transmission system for transmitting an information signal, and a reception system including an information receiving unit for receiving the information signal, and an information recording/reproducing unit for recording/reproducing the received information signal on/from a recording medium. The reception system includes a specific information storage circuit for storing specific information which is assigned peculiarly to the reception system in advance, a specific information donating circuit for adding the specific information to the received information signal or encrypting the received information signal on the basis of the specific information to supply the resulting information signal to the information recording/reproducing unit, and a specific information judgement circuit for receiving an information signal reproduced by the information recording/reproducing unit and verifying the information signal with a condition based on the specific information stored in the specific information storage circuit so that when the condition is satisfied, a signal obtained by deleting the specific information added to the reproduced information signal or by decrypting the encrypted information signal is outputted.

15 Claims, 16 Drawing Sheets

FIG. 4
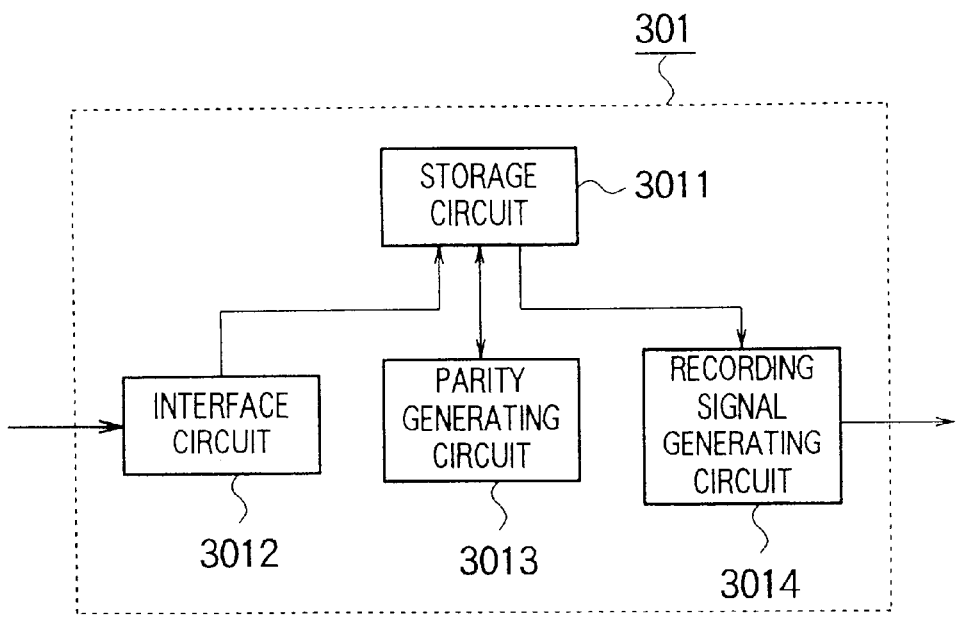
FIG. 5
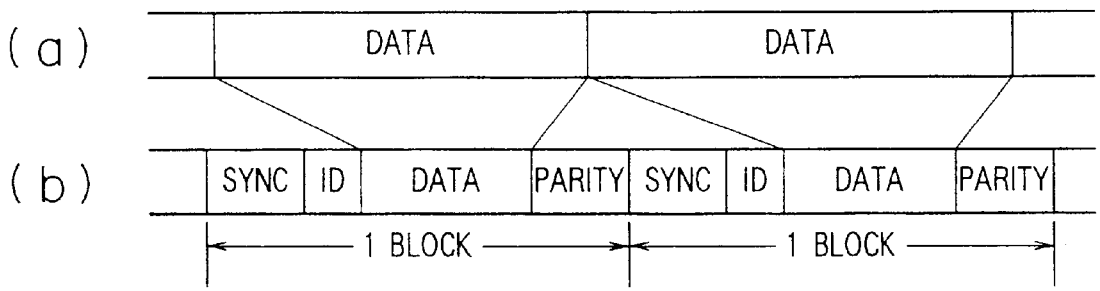
FIG. 6
| TRACK NUMBER | BLOCK NUMBER | CONTROL INFORMATION | PARITY |

NORMAL RECEPTION MODE

RECEPTION AND RECORDING MODE

TAPE REPRODUCING MODE

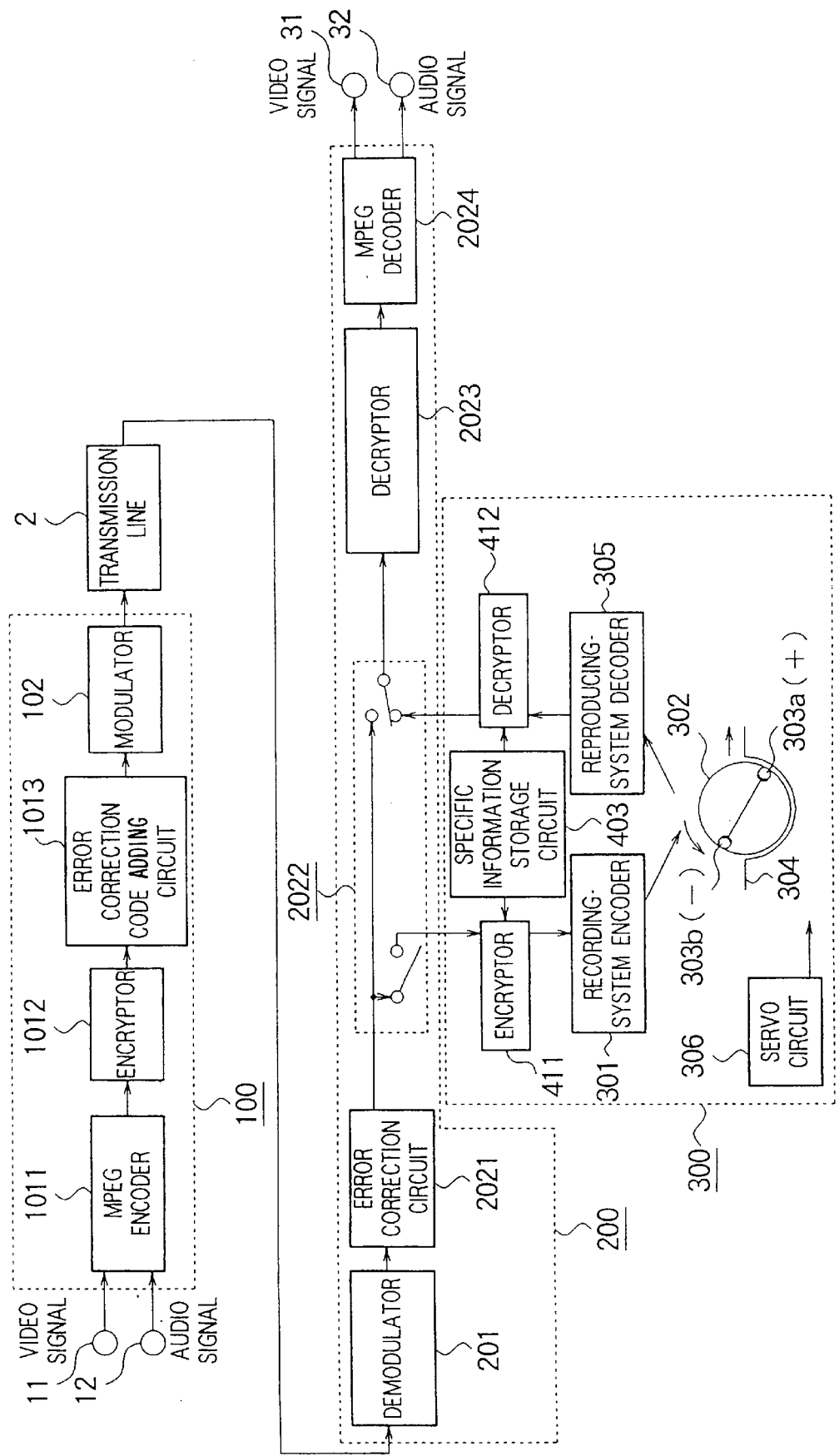

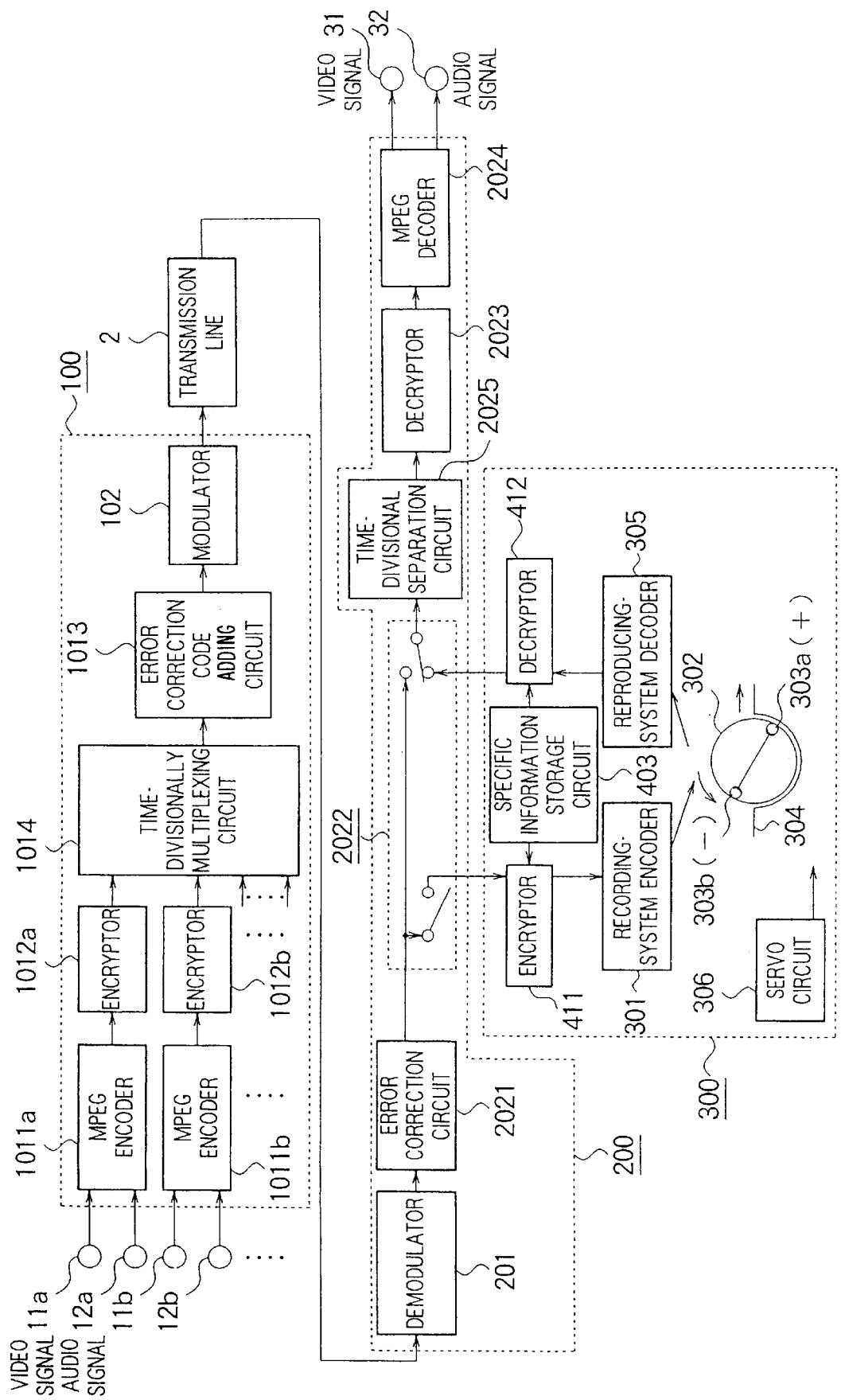

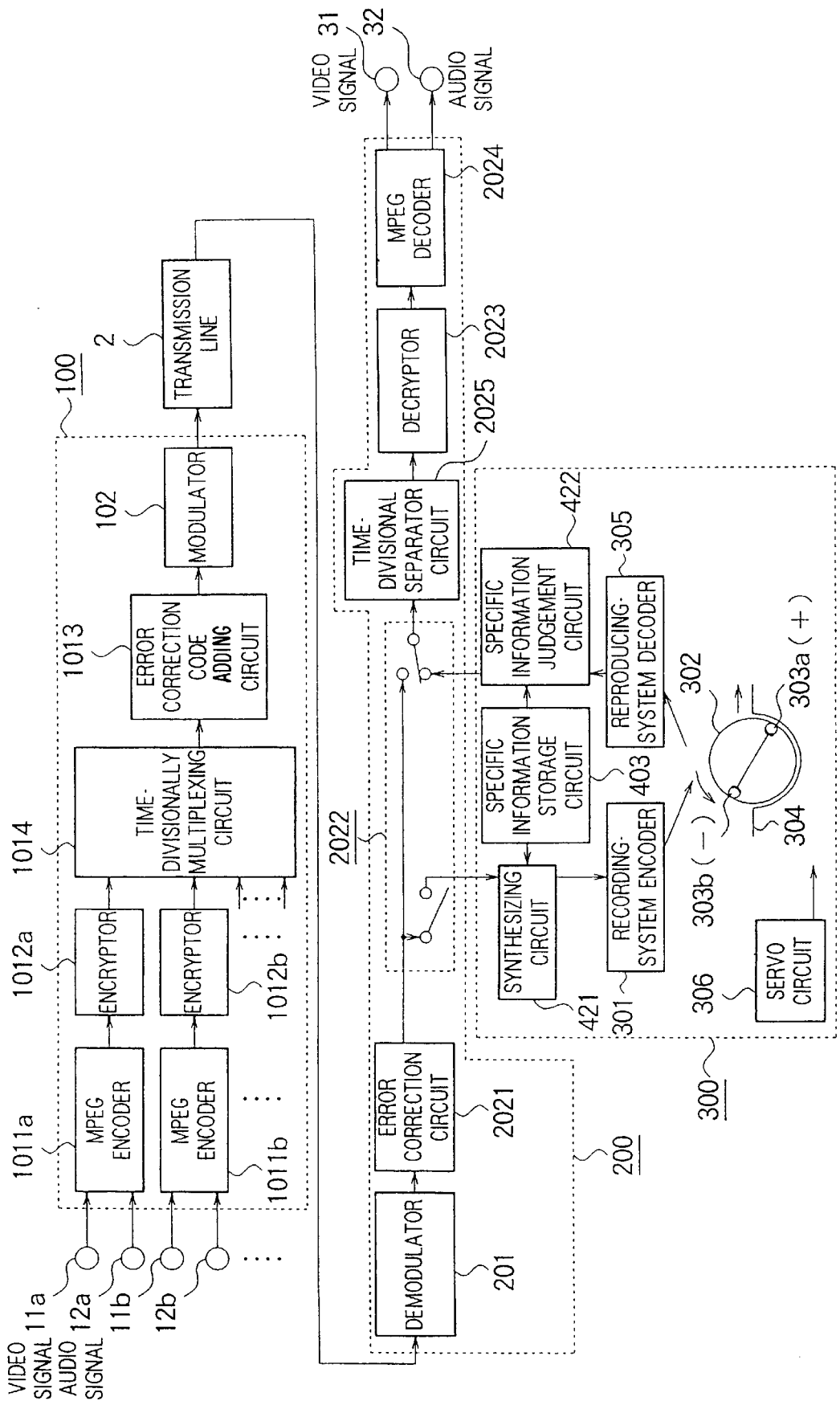

INFORMATION RECEIVING AND RECORDING/REPRODUCING APPARATUS/METHOD HAVING FUNCTION FOR LIMITING/DELIMITING FOR PROTECTING COPYRIGHT OF RECORDING INFORMATION

RELATED APPLICATIONS

This application is a continuation of application Ser. No. 08/413,429 filed Mar. 30, 1995, now abandoned.

BACKGROUND OF THE INVENTION

The present invention relates to an information receiving and recording/reproducing apparatus and particularly to an information receiving and recording/reproducing apparatus and method for protecting the copyright of received information by limiting devices enabled to be used for reproduction of the received information recorded in advance.

As described in "The Journal of the Institute of Television Engineers of Japan", Vol. 47, No. 4 (1993), pp. 494–499, there have been proposed systems called "pay per view", "video on demand", etc. in which software information for audio, video, etc. is provided in the form of multichannel information so as to be transmitted to respective homes by wire or wireless in accordance with subscriber's request.

In the aforementioned systems, received software information can be recorded/reproduced by a digital information recording/reproducing unit such as a digital VCR, or the like, without deterioration of quality particularly in the case where the software information is transmitted as digital information. It is therefore essential to protect the copyright of the received software information.

SUMMARY OF THE INVENTION

An object of the present invention is to provide an information receiving and recording/reproducing apparatus and method in which a limitation is placed on reproduction, by the aforementioned information recording/reproducing unit, of recorded software information so that the copyright of received software information can be protected.

According to an aspect of the present invention, the foregoing object is achieved by an information transmission system comprising an information transmitting unit for transmitting an information signal, a transmission line through which the information signal is transmitted, an information receiving unit for receiving the information signal transmitted by the information transmitting unit through the transmission line, and an information recording/reproducing unit for recording/reproducing the information signal received by the information receiving unit on/from a recording medium. The system further comprises: a specific indentification information storage means for storing specific identification information which is assigned to the recording/reproducing unit or to the information receiving unit in advance; a specific identification information adding means for adding the specific identification information to an input signal or encrypting the input signal on the basis of the specific identification information; and a specific identification information judgment means for verifying an input signal with a condition based on the specific information and outputting the input signal after processing the input signal when the condition is satisfied. The received information signal is recorded on a recording medium through the specific identification information adding means when the information signal is to be recorded by the information recording/reproducing unit, whereas the information signal is reproduced to be supplied to the information receiving unit through the specific identification information judgment means when the information signal is to be reproduced by the information recording/reproducing unit.

Because the received information signal is recorded on a recording medium through the specific identification information adding means when the information signal is to be recorded by the information recording/reproducing unit, copyright information is prohibited from being reproduced by any other information recording/reproducing units than the information recording/reproducing unit used for recording the copyright information or copyright information is prohibited from being reproduced by any other information receiving units than the information receiving unit used for receiving the copyright information. Thus, the outflow of software information can be prevented, so that the copyright thereof can be protected securely.

BRIEF DESCRIPTION OF THE DRAWINGS

FIG. 4 is a block diagram showing a specific example of the recording-system encoder depicted in FIG. 1;

FIG. 5 is a view of an input/output signal of the recording-system encoder depicted in FIG. 4;

FIG. 6 is a view showing an example of the structure of the ID portion depicted in FIG. 5;

FIG. 11 is a block diagram showing another embodiment of the present invention;

FIG. 13 is a block diagram showing a further embodiment of the present invention;

FIG. 14 is a block diagram showing a further embodiment of the present invention;

DESCRIPTION OF THE PREFERRED EMBODIMENTS

Embodiments of the present invention will be described below with reference to the drawings.

Figure 1:
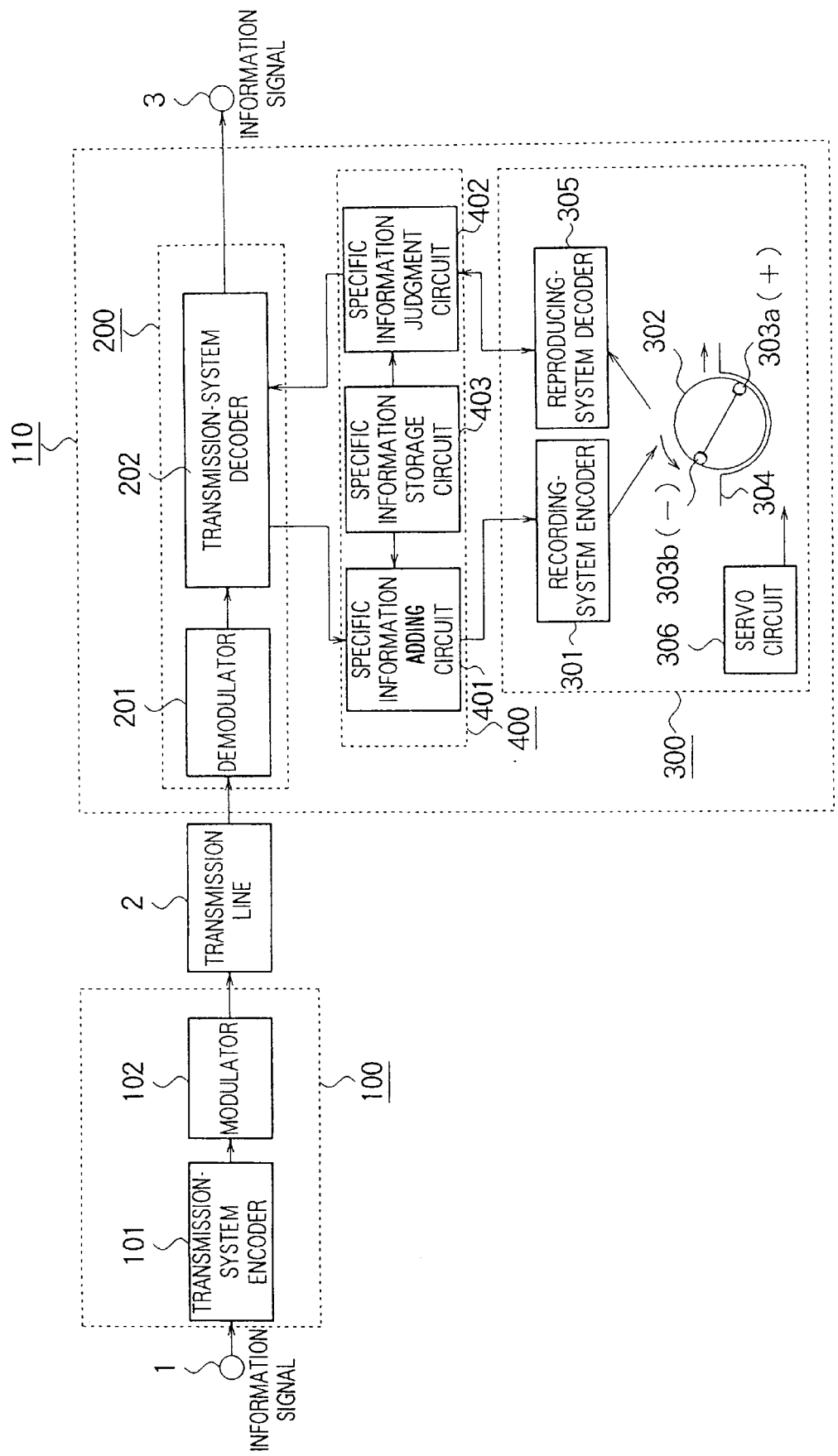
FIG. 1 is a block diagram showing an embodiment of an information receiving and recording/reproducing apparatus according to the present invention.

FIG. 1 is a block diagram showing an embodiment of an information receiving and recording/reproducing apparatus for digital information according to the present invention. In FIG. 1, the reference numeral 100 designates a transmission system; 110, a reception system; 200, an information receiving unit; 300, an information recording/reproducing unit; 400, a specific identification information processing circuit; 1, an input terminal; 2, a transmission line; 3, an output terminal; 101, a transmission-system encoder; 102, a modulator; 201, a demodulator; 202, a reception-system decoder; 401, a specific information adding circuit; 402, a specific identification information judgment circuit; 403, a specific information storage circuit; 301, a recording-system encoder; 302, a rotary drum; 303a and 303b, magnetic heads; 304, a magnetic tape; 305, a reproducing-system decoder; and 306, a servo circuit.

In the embodiment of FIG. 1, the apparatus can be roughly classified into the transmission system 100 and the reception system 110. The reception system 110 is constituted by the information receiving unit 200, the information recording/reproducing unit 300 and the specific identification information processing circuit 400.

An information signal given from the input terminal 1 is encoded at a predetermined format by the transmission-system encoder 101, modulated by the modulator 102 and then transmitted by the transmission line 2. The signal transmitted by the transmission line 2 is demodulated by the demodulator 201, decoded by the reception-system decoder 202 and then put out at the output terminal 3.

Further, specific identification information which is stored in advance in the specific identification information storage circuit 403 so as to be uniquely assigned to the reception system 110 is added to a partly decoded signal outputted from the reception-system decoder 202, by the specific identification information donating circuit 401.

Figure 2:
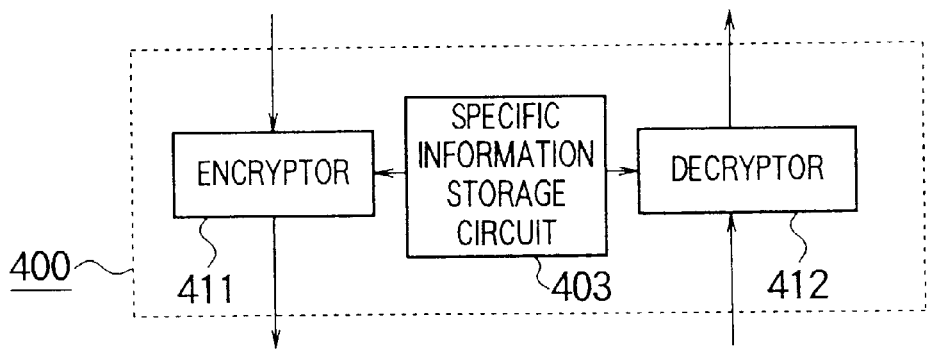
FIG. 2 is a block diagram showing a specific example of the specific information processing circuit depicted in FIG. 1.

FIG. 2 is a block diagram showing a specific example of this specific identification information processing circuit 400. In FIG. 2, the reference numeral 411 designates an encryptor; and 412, a decryptor.

In FIG. 2, a signal outputted from the reception-system decoder 202 (FIG. 1) is encrypted by the encryptor 411 with use of the specific identification information stored in the specific identification information storage circuit 403 in advance as a key.

Figure 3:
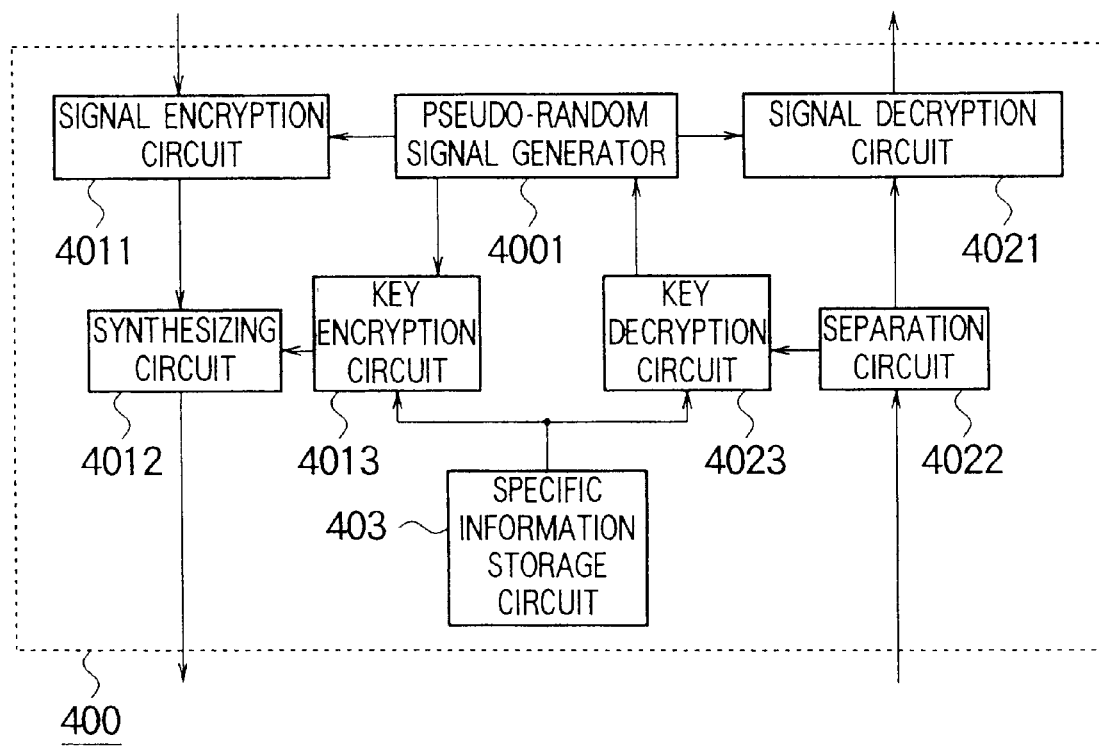
FIG. 3 is a detailed block diagram of the specific information processing circuit depicted in FIG. 2.

FIG. 3 is a block diagram showing more in detail the specific example of the specific information processing circuit 400 depicted in FIG. 2. In FIG. 3, the reference numeral 4001 designates a pseudo-random signal generator; 4011, a signal encryption circuit; 4012, a synthesizing circuit; 4013, a key encryption circuit; 4021, a signal decryption circuit; 4022, a separation circuit; and 4023, a key decryption circuit.

In FIG. 3, a pseudo-random signal generated by the pseudo-random signal generator 4001 is added to an input signal in the signal encryption circuit 4011 to thereby encrypt the input signal. The pseudo-random signal generator 4001 momentarily changes the sequence of generated pseudo-random pulses momently and supplies information concerning the sequence of generated pseudo-random pulses as an encryption key to the key encryption circuit 4013. The key encryption circuit 4013 encrypts the encryption key with use of the information obtained from the specific identification information storage circuit 403 as a key. The synthesizing circuit 4012 synthesizes a signal from the encryption key encrypted by the key encryption circuit 4013 and the signal encrypted by the signal encryption circuit 4011 and supplies the synthesized signal to the recording-system encoder 301. In the recording-system encoder 301, the signal thus supplied is encoded at a format suitable for recording/reproducing.

FIG. 4 is a block diagram showing a specific example of the recording-system encoder 301 depicted in FIG. 1. In FIG. 4, the reference numeral 3011 designates a storage circuit; 3012, an interface circuit; 3013, a parity generating circuit; and 3014, a recording signal generating circuit.

In FIG. 4, a signal outputted from the specific identification information donating circuit 401 (FIG. 1) is first stored, as data shown in the diagram (a) of FIG. 5, in the storage circuit 3011 through the interface circuit 3012. A parity signal is generated in the parity generating circuit 3013 on the basis of the data stored in the storage circuit 3011, and the parity signal is stored in the storage circuit 3011.

The recording signal generating circuit 3014 reads out data and parity signals stored in the storage circuit 3011 and adds a sync signal and an ID signal to the data and parity signals to thereby form a block type signal as shown in the diagram (b) of FIG. 5.

FIG. 6 shows an example of the structure of an ID portion of the signal depicted in the diagram (b) of FIG. 5. For example, the ID portion is composed of "track number" for identifying a recording track, "block number" for identifying a position in the track, "control information" such as recording time, program number, etc. on a recording medium, and "parity" for detection/correction of error in the ID signal.

The signal thus encoded is supplied to the magnetic heads 303a and 303b on the rotary drum 302 and recorded on the magnetic tape 304 in FIG. 1.

At the time of reproducing, a signal reproduced by the magnetic heads 303a and 303b is supplied to the reproducing-system decoder 305.

The aforementioned recording/reproducing operation is controlled by the servo circuit 306.

Figure 7:
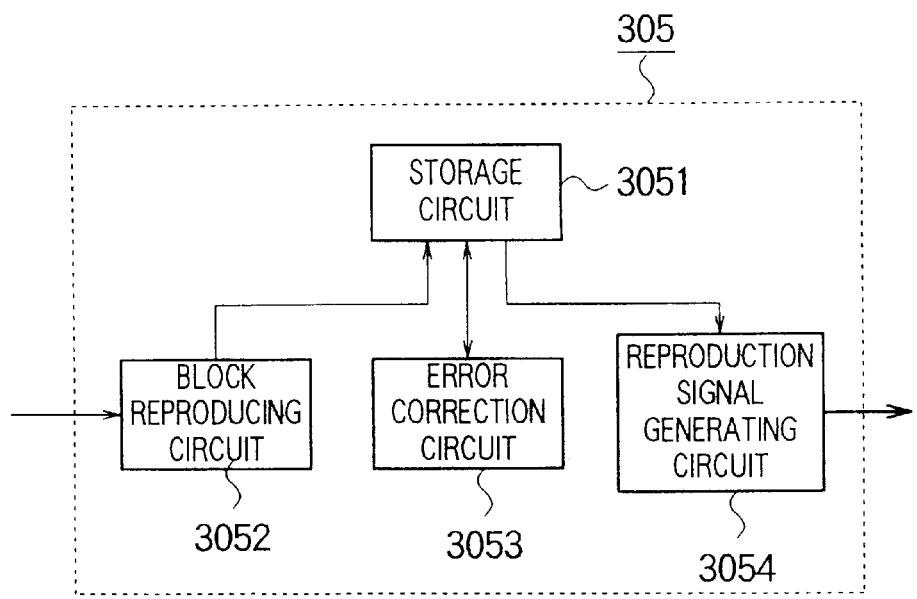
FIG. 7 is a block diagram showing a specific example of the reproducing-system decoder depicted in FIG. 1.

FIG. 7 is a block diagram showing a specific example of the reproducing-system decoder 305 depicted in FIG. 1. In FIG. 7, the reference numeral 3051 designates a storage circuit; 3052, a block reproducing circuit; 3053, an error correction circuit; and 3054, a reproduction signal generating circuit.

In FIG. 7, a signal reproduced by the magnetic heads 303a and 303b is inputted to the block reproducing circuit 3052, in which data, ID and parity portions are detected on the basis of the sync signal so that not only these portions are stored in predetermined positions of the storage circuit 3051 but also data error is corrected by the error correction circuit 3053 on the basis of the parity stored in the storage circuit 3051. Further, in the reproduction signal generating circuit 3054, error-corrected data stored in the storage circuit 3051 are read out successively in a track number and block number sequence.

The signal outputted from the reproducing-system decoder 305 is supplied to the decryptor 412 shown in FIG. 2, so that the signal is decrypted by using the specific identification information in advance stored in the specific identification information storage circuit 403 as a key. In the decryptor, for example, the input signal is separated into encrypted encryption key information and the residual information by the separation circuit 4022 in FIG. 3, so that not only the encrypted encryption key information is supplied to the key decryption circuit 4023 but also the residual information is supplied to the signal decryption circuit 4021. In the key decryption circuit 4023, the encrypted encryption key information is decrypted with use of the specific identification information stored in the specific identification information storage circuit 403 as a key to thereby obtain encryption key information. The same pseudo-random signal as that generated at the time of recording is generated by the pseudo-random signal generator 4001 and the input signal of the signal decryption circuit 4021 is decrypted by the signal decryption circuit 4021, so that the same signal as that supplied to the signal decryption circuit 4011 at the time of recording is put out. This signal is supplied to the reception-system decoder 202 (FIG. 1) again, so that this signal is decoded and put out at the output terminal 3.

Figure 8:
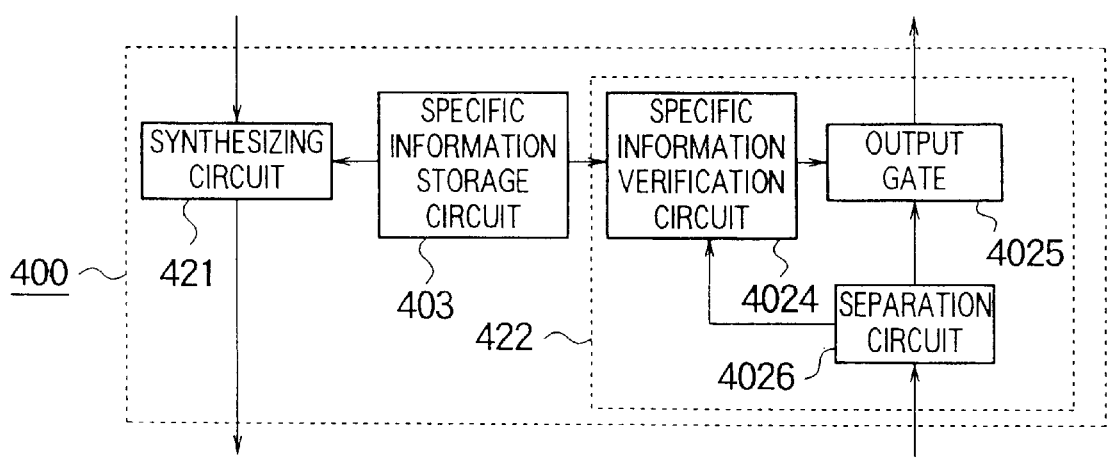
FIG. 8 is a block diagram showing another specific example of the specific information processing circuit depicted in FIG. 1.

FIG. 8 is a block diagram showing another specific identification example of the specific information processing circuit 400 depicted in FIG. 1. In FIG. 8, the reference numeral 421 designates a synthesizing circuit; 422, a second specific identification information judgment circuit; 4024, a specific identification information verification circuit; 4025, an output gate; and 4026, a separation circuit. Like numerals in each of FIGS. 2 and 8 refer to like parts.

In FIG. 8, specific identification information given from the specific identification information storage circuit 403 is added to a signal outputted from the reception-system decoder 202 (FIG. 1), by the synthesizing circuit 421. Further, a signal given from the reproducing-system decoder 305 (FIG. 1) is separated into specific identification information and the residual part by the separation circuit 4026 so that the separated specific identification information is supplied to the specific identification information verification circuit 4024 whereas the residual part is supplied to the output gate 4025. The specific identification information verification circuit 4024 verifies the separated specific identification information with information given from the specific identification information storage circuit 403. When the separated information coincides with the information given from the specific identification information storage circuit 403, the specific identification information verification circuit 4024 supplies a signal for opening the output gate 4025. Upon reception of this signal from the specific identification information verification circuit 4024, the output gate 4025 is opened so that a signal from the separation circuit 4026 is supplied to the reception-system decoder 202 of FIG. 1.

Figure 9:
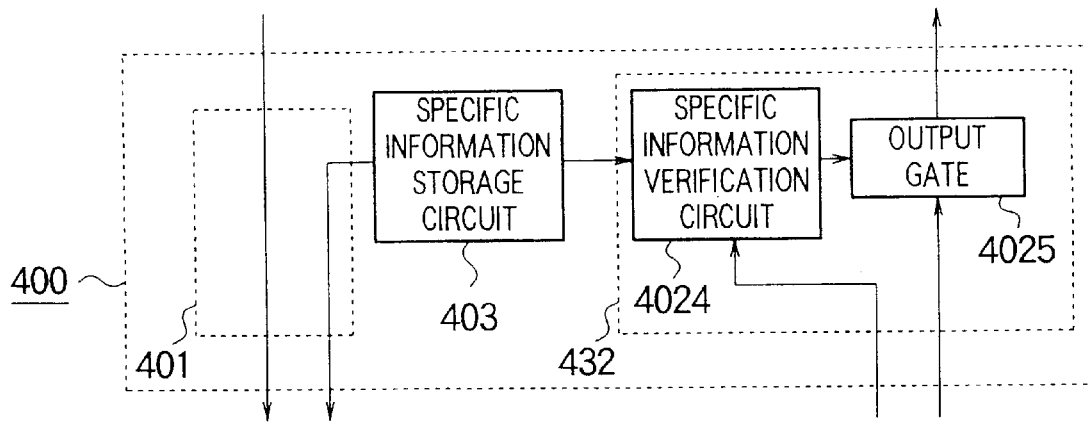
FIG. 9 is a block diagram showing a further specific example of the specific information processing circuit depicted in FIG. 1.

FIG. 9 is a block diagram showing a further specific example of the specific identification information processing circuit 400 depicted in FIG. 1. In FIG. 9, the reference numeral 432 designates a third specific identification information judgment circuit. Like numerals in each of FIGS. 8 and 9 refer to like parts.

Figure 10:
FIG. 10 is a view showing another example of the structure of the ID portion depicted in FIG. 5.

In FIG. 9, the specific identification information stored in the specific identification information storage circuit 403 is supplied to the recording-system encoder 301 (FIG. 1) and stored in a predetermined position of the storage circuit 3011 (FIG. 4) of the recording-system encoder 301. Further, the signal outputted from the reception-system decoder 202 (FIG. 1) is supplied to the recording-system encoder 301, in which a parity portion is generated and sync and ID portions are added to the signal while the specific identification information stored in the storage circuit 3011 is added to a part of the ID portion as shown in FIG. 10. At the time of reproduction, the ID portion is detected in the reproducing-system decoder 305 (FIG. 1), so that data and specific identification information recorded in the ID portion are read out from the reproduction signal generating circuit 3054 (FIG. 7) of the reproducing-system decoder 305 so as to be supplied to the output gate 4025 and the specific identification information verification circuit 4024, respectively. This specific identification information verification circuit 4024 verifies the supplied specific identification information with specific information stored in the specific identification information storage circuit 403, so that when the supplied specific identification information coincides with the stored specific identification information, the specific identification information verification circuit 4024 supplies a signal for opening the output gate 4025. Upon reception of this signal from the specific identification information verification circuit 4024, the output gate 4025 is opened so that the signal is supplied to the reception-system decoder 202 of FIG. 1.

As described above, a received information signal is recorded by the information recording/reproducing unit after specific identification information assigned in advance is added to the received information signal, so that at the time of reproduction, the specific identification information is separated from the information signal recorded on a recording medium and is compared with specific identification information assigned peculiarly to the reception system so that the information signal is put out only in the case where the separated specific identification information coincides with the assigned specific identification information. As a result, a recorded information signal is disabled to be reproduced by any other reception systems than the reception system receiving the recorded information signal, so that the copyright of the information signal can be protected securely.

FIG. 11 is a block diagram showing another embodiment of the information receiving and recording/reproducing apparatus according to the present invention. In FIG. 11, the reference numeral 11 designates an input terminal for digital video signal; 12, an input terminal for digital audio signal; 1011, an MPEG (Moving Picture Experts Group) encoder; 1012, an encryptor; 1013, an error correction code adding circuit; 2021, an error correction circuit; 2022, a changeover switch; 2023, a decryptor; 2024, an MPEG decoder; 31, an output terminal for video signal; and 32, an output terminal for audio signal. Like numerals in each of FIGS. 1 and 11 refer to like parts. Incidentally, the specific identification information processing circuit 400 described preliminarily is contained in the information recording/reproducing unit 300.

This embodiment is adapted to a system in which video/audio software information is encrypted and transmitted so that the software information can be enjoyed only by subscribers.

In FIG. 11, a digital video signal given from the input terminal 11 and a digital audio signal given from the input terminal 12 are multiplexed while compressed to an adequate quantity of information by the MPEG encoder 1011, so that the multiplex signal from the MPEG encoder is encrypted by the encryptor 1021, supplied with an error correction code by the error correction code donating circuit 1013, modulated by the modulator 102 and then sent out to the transmission line 2.

The signal transmitted through the transmission line 2 is demodulated by the demodulator 201 and subjected to error correction by the error correction circuit 2021 whereafter the signal which has been encrypted by the encryptor 1012 is decrypted by the decryptor 2023 through the changeover switch 2022 and separated into a video signal and an audio signal by the MPEG decoder 2024, so that the video and audio signals are decompressed to original quantities of information and put out at the output terminals 31 and 32, respectively.

Figure 12A:
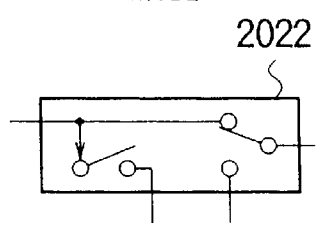
FIGS. 12A, 12B and 12C are views showing respective switching states of the changeover switch 2022 depicted in FIG. 11.
Figure 12B:
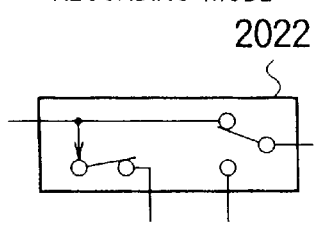
Figure 12C:
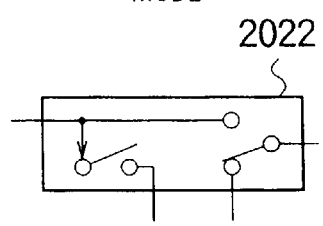

The changeover switch 2022 is operated as shown in FIG. 12A at the time of ordinary reception, operated as shown in FIG. 12B at the time of simultaneous execution of reception and recording and operated as shown in FIG. 12C at the time of reproduction from a tape.

Further, a signal that branches from the changeover switch 2022 is supplied to the information recording/reproducing unit 300, in which the signal is further encrypted by the encryptor 411 with use of specific identification information, such as information of contract with subscribers, information individually assigned to each subscriber, etc., stored in the specific identification information storage circuit 403 as a key and then the encrypted signal is recorded on the magnetic tape 304 through the recording-system encoder 301 in such a manner as described above.

At the time of reproduction, a signal which has been encrypted by the encryptor 411 is supplied from the reproducing-system decoder 305 to the decryptor 412, in which the signal is decrypted by the decryptor 412 with use of the specific identification information stored in the specific identification information storage circuit 403 as a key whereafter the signal is supplied through the changeover switch 2022 to the decryptor 2023 in the reception system 200, in which the signal is processed by the decryptor 2023 and the MPEG decoder 2024, so that a video signal and an audio signal are put out at the output terminals 31 and 32, respectively.

Although this embodiment has shown the case where a specific example shown in FIG. 3 is used as the specific information processing circuit 400, specific examples shown in FIGS. 8 and 9 may be used.

FIG. 13 is a block diagram showing a further embodiment of the information receiving and recording/reproducing apparatus according to the present invention. In FIG. 13, the reference numeral 1014 designates a time-divisionally multiplexing circuit; and 2025, a time-divisional separation circuit. Like numerals in each of FIGS. 11 and 13 refer to like parts.

In FIG. 13, this embodiment is designed so that multi-channel software information is transmitted/received after multiplexed by the time-divisionally multiplexing circuit 1014. Although this embodiment shows the case where a multiplex signal is entirely recorded/reproduced by the information recording/reproducing apparatus 300 before a desired channel is separated from the recorded/reproduced multiplex signal by the time-divisional separation circuit 2025 to thereby obtain soft information, the invention may be applied to the case where the output signal of the time-divisional separation circuit 2025 is recorded/reproduced by the information recording/reproducing unit 300.

FIG. 14 is a block diagram showing a further embodiment of the information receiving and recording/reproducing apparatus according to the present invention. Like numerals in each of FIGS. 8, 13 and 14 refer to like parts.

This embodiment shows the case where a circuit shown in FIG. 8 is used as the specific information processing circuit 400 and operates as described above with reference to FIGS. 8 and 13, so that the description of this embodiment will be omitted.

Figure 15:
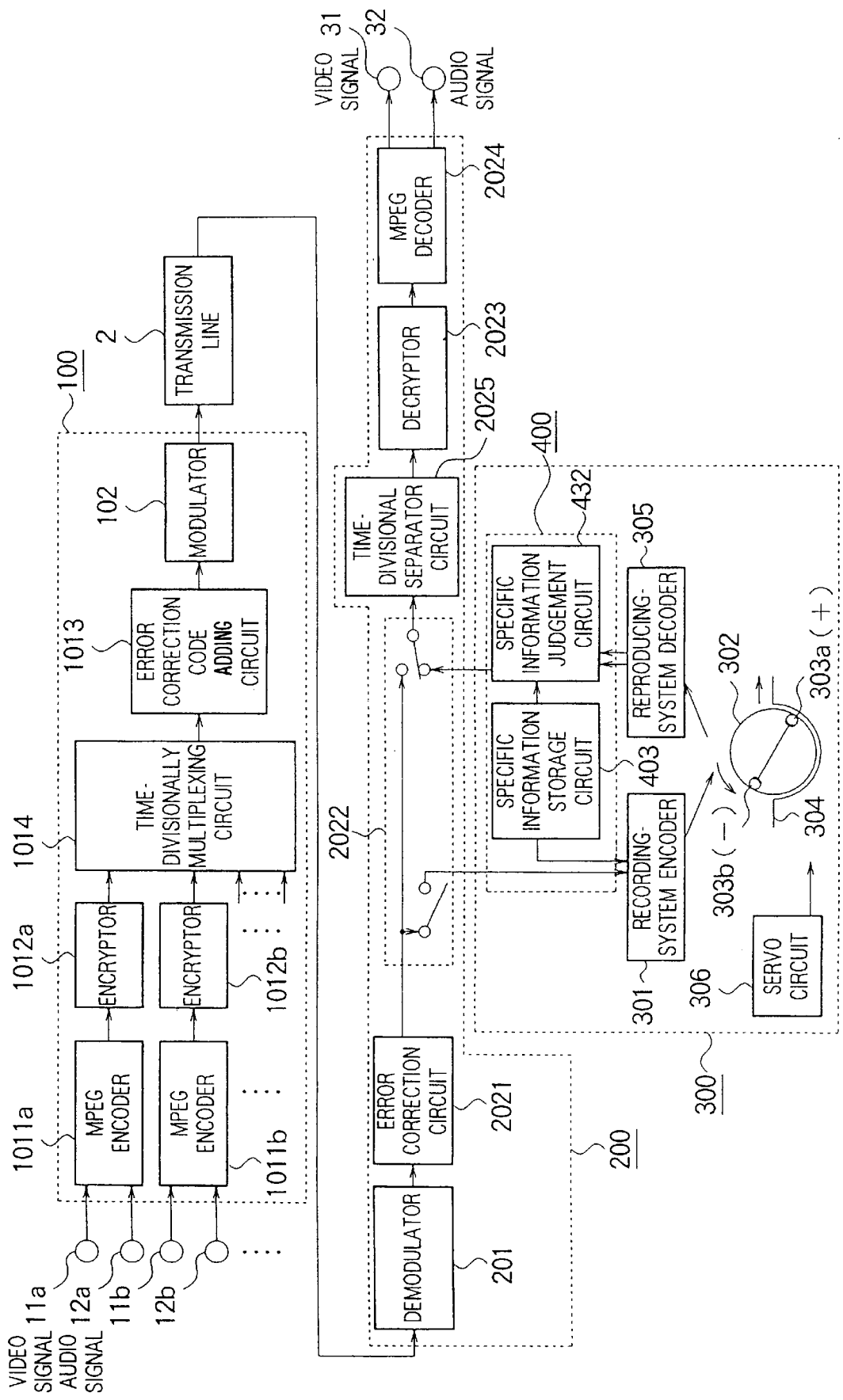
FIG. 15 is a block diagram showing a further embodiment of the present invention.

FIG. 15 is a block diagram showing a further embodiment of the information receiving and recording/reproducing apparatus according to the present invention. This embodiment shows the case where a circuit shown in FIG. 9 is used as the specific identification information processing circuit 400 in the embodiment of FIG. 13, so that the description of this embodiment will be omitted.

In each of the aforementioned embodiments, the information recording/reproducing unit 300 contains the specific identification information processing circuit 400, so that even in the case where information recorded on a magnetic tape 304 by one information recording/reproducing unit 300 is to be reproduced from the magnetic tape 304 by any other information recording/reproducing units, coincidence cannot be obtained in the judgment of specific identification information so that video and audio signals recorded on the magnetic tape 304 are not outputted. That is, the information recording/reproducing unit enabled to be used for reproducing information from this magnetic tape 304 is limited, so that the copyright of software information received can be protected.

Figure 16:
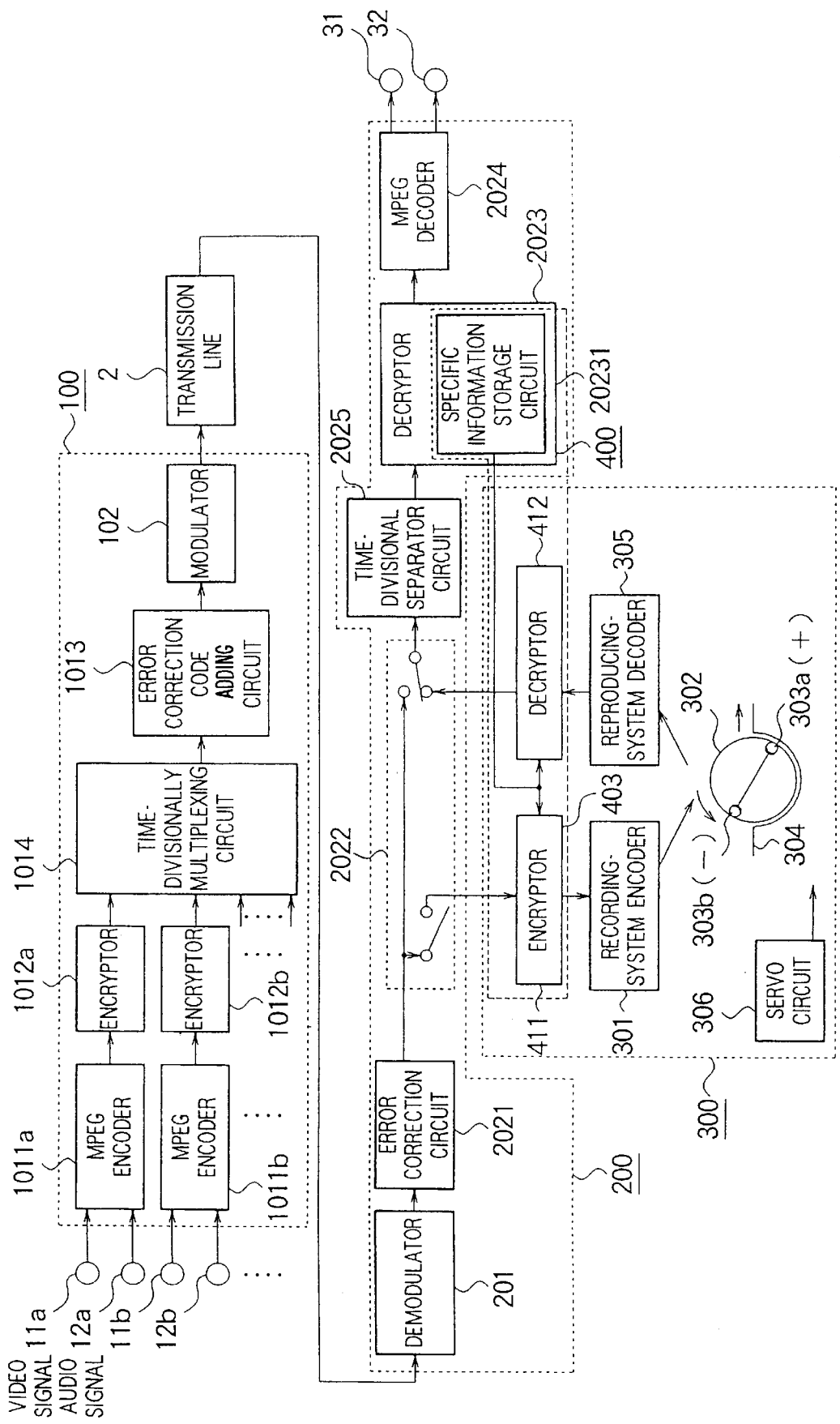
FIG. 16 is a block diagram showing a further embodiment of the present invention.

FIG. 16 is a block diagram showing a further embodiment of the information receiving and recording/reproducing apparatus according to the present invention. Like numerals in each of FIGS. 13 and 16 refer to like parts.

In FIG. 16, this embodiment is designed so that the information recording/reproducing unit 300 contains an encryptor 411 and a decryptor 412 and that a specific identification information storage circuit 20231 in which specific identification information for decrypting a signal having been encrypted in the transmission system 100 is stored as specific identification information for the specific identification information processing circuit 400 (FIG. 1) is used so as to be contained in a decryptor 2023 of the information receiving unit 200.

Figure 17:
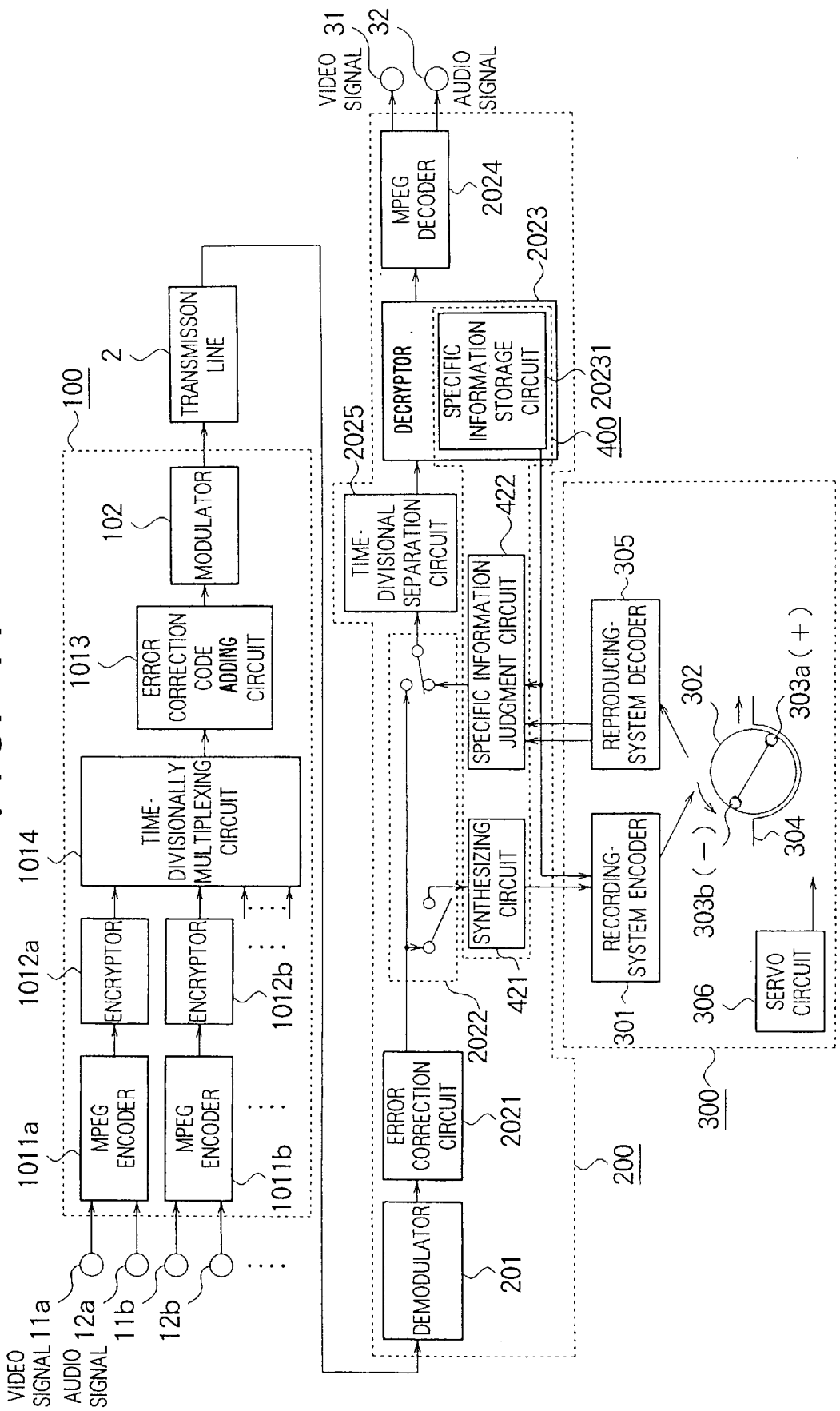
FIG. 17 is a block diagram showing a further embodiment of the present invention.

FIG. 17 is a block diagram showing a further embodiment of the information receiving and recording/reproducing apparatus according to the present invention.

This embodiment is designed so that specific identification information is obtained from the specific identification information storage circuit 20231 in the same manner as in the embodiment of FIG. 16 and that the specific identification information processing circuit 400 shown in FIG. 8 is further provided in the information receiving unit.

Figure 18:
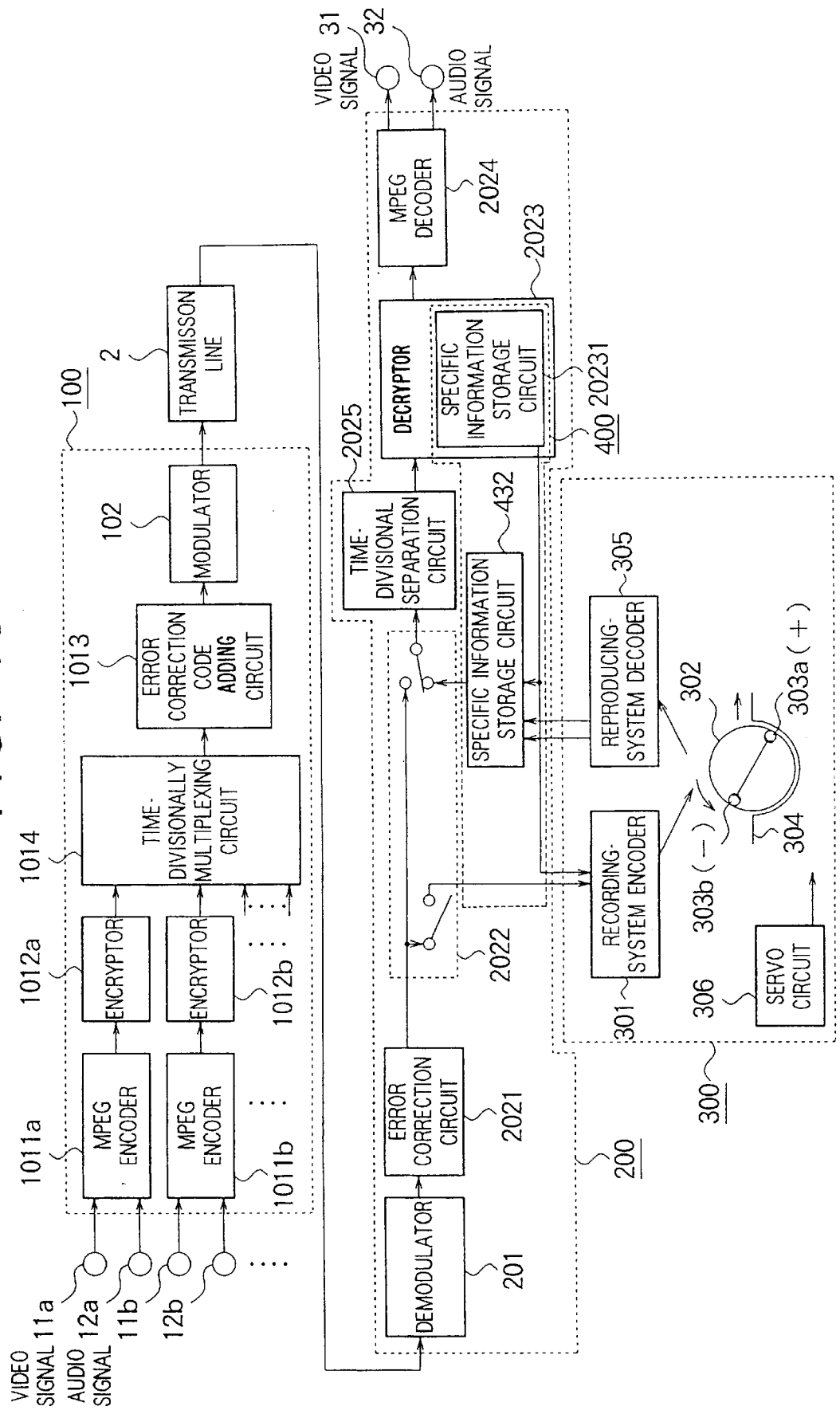
FIG. 18 is a block diagram showing a further embodiment of the present invention.

FIG. 18 is a block diagram showing a further embodiment of the information receiving and recording/reproducing apparatus according to the present invention.

This embodiment is designed so that specific identification information is obtained from the specific identification information storage circuit 20231 in the same manner as in the embodiment of FIG. 16 and that the specific identification information processing circuit 400 shown in FIG. 9 is further provided in the information receiving unit.

In each of the aforementioned embodiments, the information recording/reproducing unit 300 has no specific identification information, so that the information recording/reproducing unit is not limited as long as this information receiving unit 200 is used. Accordingly, even in the case where the information recording/reproducing unit 300 is interchanged to a new one, information received by one information receiving unit 200 and recorded on a magnetic tape is enabled to be reproduced from the magnetic tape through this information receiving unit 200 but is disabled from being reproduced through any other information receiving units because coincidence cannot be obtained in the judgment of specific identification information. Further, the specific identification information adding circuit 401 and the specific identification information judgment circuit 402 may be provided in the information receiving unit 200 or in the information recording/reproducing unit 300.

Figure 19:
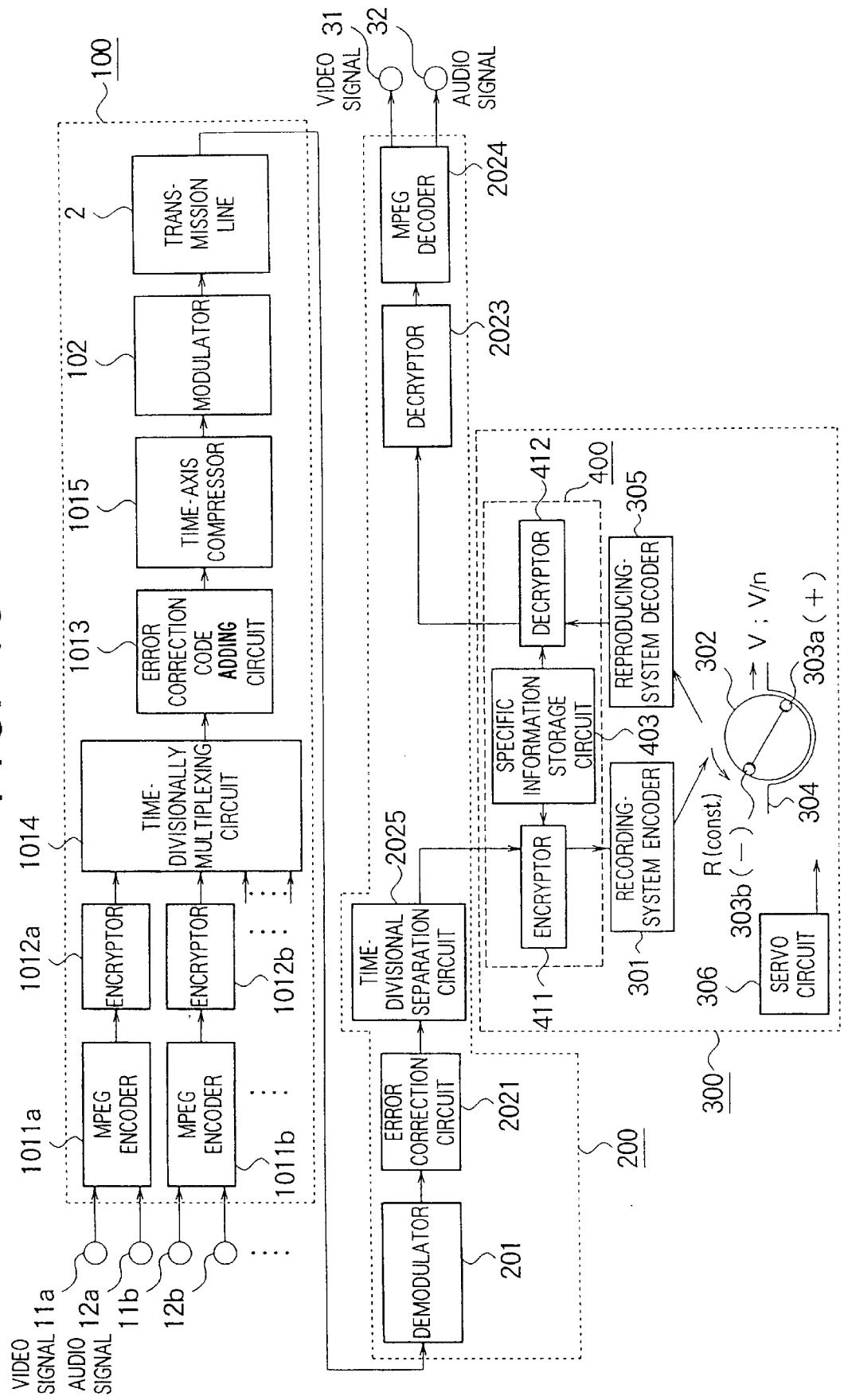
FIG. 19 is a block diagram showing a further embodiment of the present invention.

FIG. 19 is a block diagram showing a further embodiment of the information receiving and recording/reproducing apparatus according to the present invention. In FIG. 19, the reference numeral 306 designates a servo circuit; and 1015, a time axis compressor. Like numerals in each of the aforementioned drawings refer to like parts.

This embodiment is designed so that time-axially compressed information is received and recorded to thereby shorten recording time and that at the time of reproduction, the compressed information is time-axially decompressed to obtain the original information.

In FIG. 19, multichannel software information is multiplexed by the time-divisionally multiplexing circuit 1014 and time-axially compressed to 1/n (n is an integer) by the time-axis compressor 1015 to increase the transmission rate by n times. The compressed signal is modulated by the modulator 102 and sent out to the transmission line 2.

Figure 20:
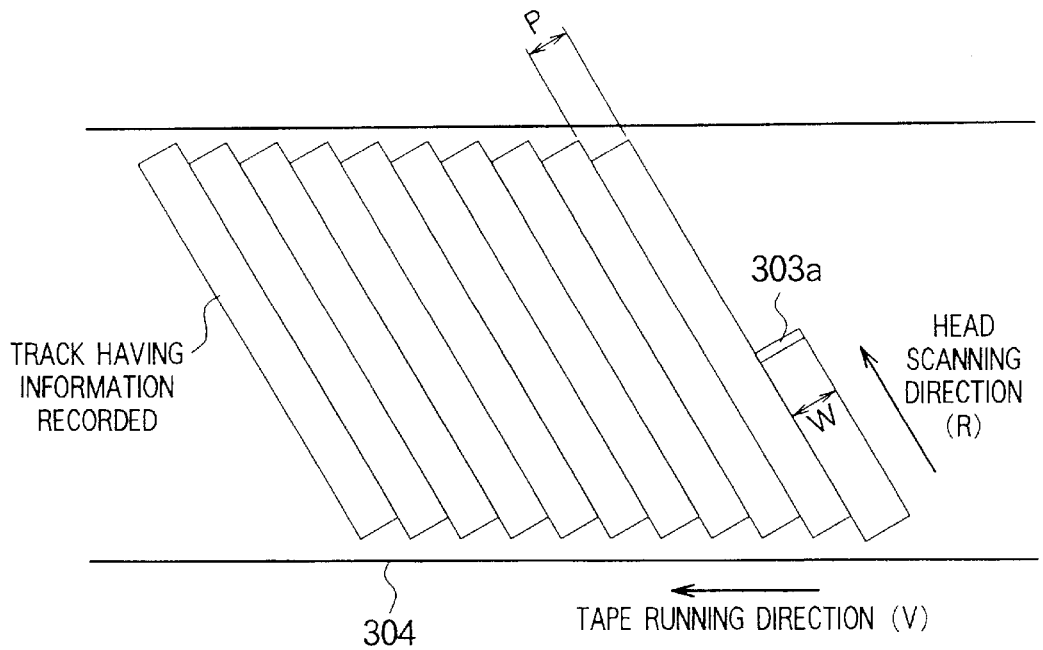
FIG. 20 is a view of a tracking pattern at the time of recording in the embodiment depicted in FIG. 19.

The signal received through the transmission line 2 is demodulated by the demodulator 201, subjected to error correction by the error correction circuit 2021 and recorded by the information recording/reproducing unit 300 through the encryptor 411. The rotational speed of the rotary drum 302 and the running speed of the magnetic tape 304 in this occasion are set, for example, to be R and V, respectively, by the servo circuit 306. FIG. 20 shows a tracking pattern at the time of recording. In FIG. 20, P represents a track pitch, and W represents the head width of each of the magnetic heads 303a and 303b. The head width W is larger than the track pitch P, for example, the head width W is set to be 1.5 times as large as the track pitch P.

At the time of reproduction, the servo circuit 306 rotates the rotary drum 302 at a rotational speed (m/n)R which is m/n (1≦m≦n) as high as the rotational speed at the time of recording, so that the magnetic tape 304 is made to run at a speed V/n which is 1/n as high as the speed at the time of recording. In the case of m=1, the magnetic heads 303a and 303b are arranged so as to scan just on the pattern of a track having information recorded. This embodiment shows the case of m=n, that is, the case where the rotary drum 302 is rotated at the same speed R as that at the time of recording. By rotating the rotary drum 302 at the same speed as that at the time of recording, the frequency of the reproduced signal can be kept high, so that a desired reproduction output level can be maintained. Further, the rotation of the rotary drum 302 can be controlled easily.

Figure 21:
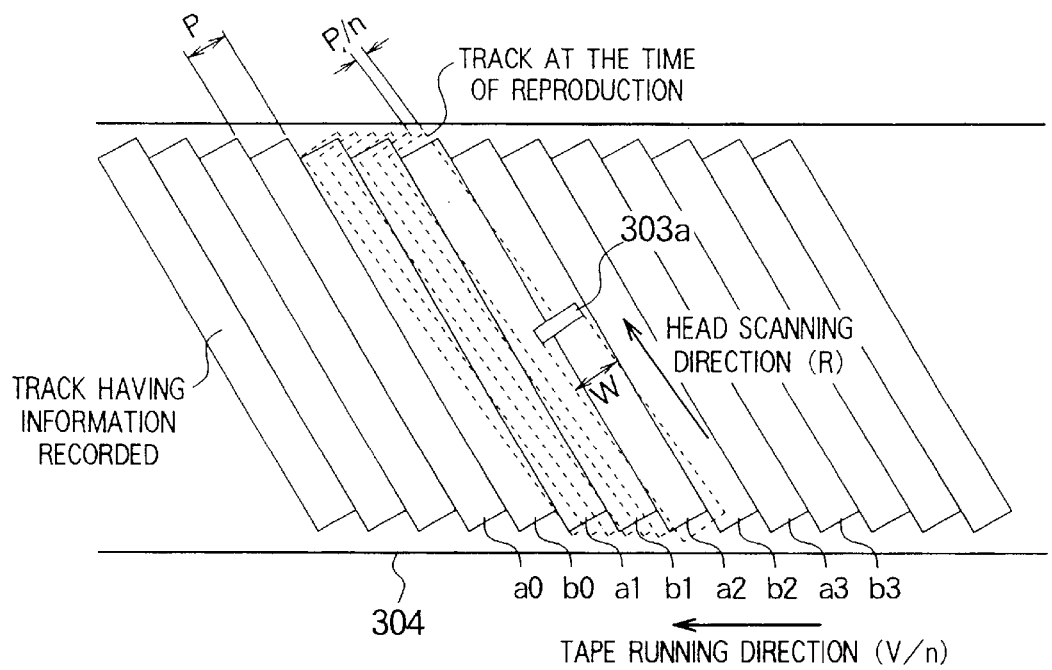
FIG. 21 is a view of a tracking pattern at the time of reproducing in the embodiment depicted in FIG. 19.

FIG. 21 shows a tracking pattern at the time of reproduction. In FIG. 21, the solid line represents the pattern of a track having information recorded, and the broken line represents the scanning locus of the magnetic heads 303a and 303b. As shown in FIG. 21, the scanning pitch of the magnetic heads 303a and 303b is set to be 1/n as large as the tracking pitch P so that scanning is performed approximately by n times per one track though the scanning angle varies correspondingly to the value of n.

Figure 22:
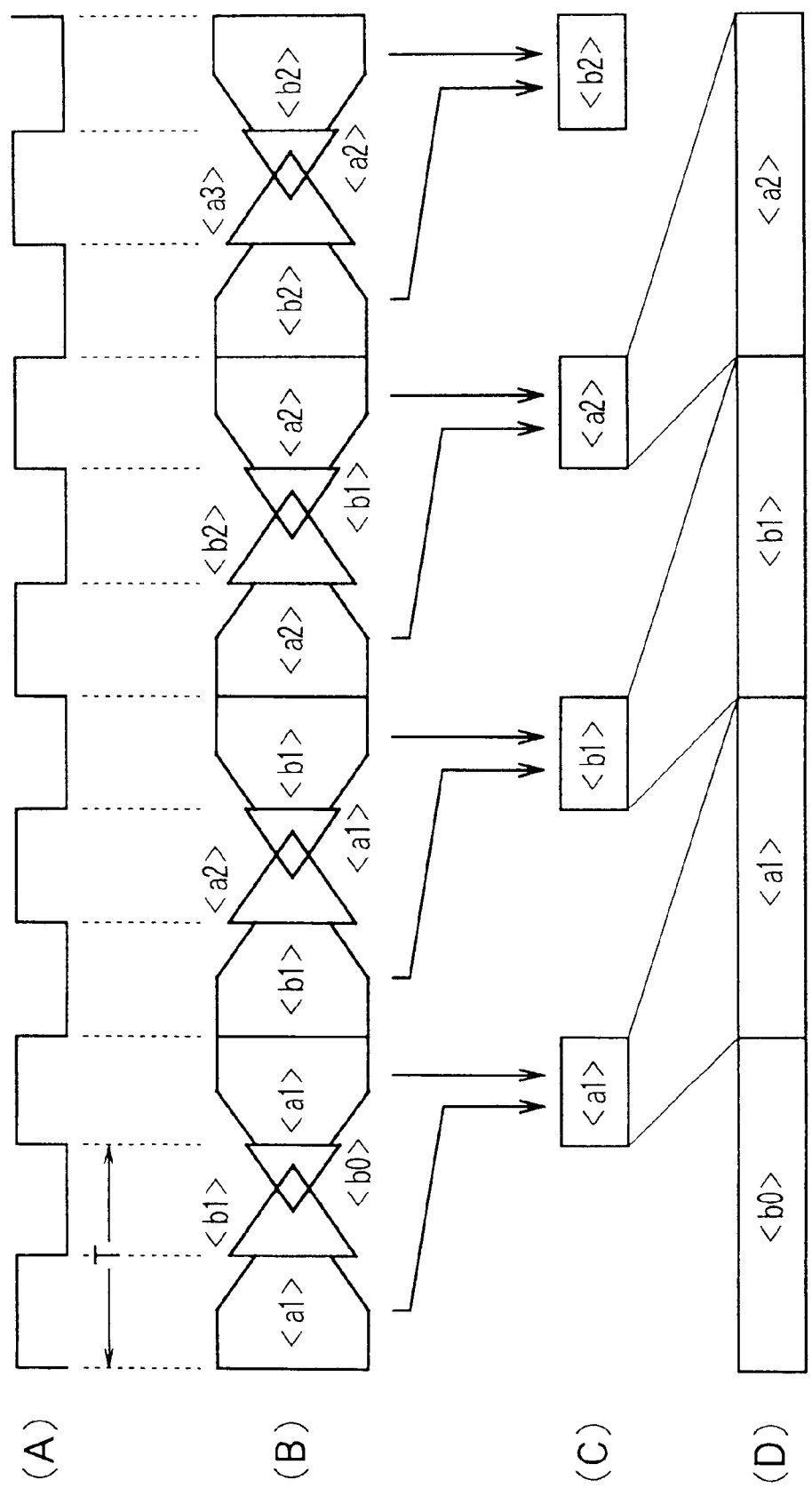
FIG. 22 is a view of waveforms showing a signal sampling process in the embodiment depicted in FIG. 19.

FIG. 22 is a view of waveforms showing a process of taking out a signal from n-times scanning (n=3 in FIG. 22). In FIG. 22, waveform (A) shows the timing of the rotary drum 302, and T represents the period of one rotation of the rotary drum 302. Waveform (B) shows the envelope of a signal reproduced by the magnetic heads 303a and 303b in this occasion. In this manner, scanning is performed by about three times per one track. Further, as described preliminarily, the head width W of the magnetic heads 303a and 303b is set to be 1.5 times as large as the tracking pitch P, so that large part of the magnetic heads 303a and 303b are placed on a track having information recorded even in the case where the scanning angle differs from the angle of the track having information recorded. Accordingly, original data (waveform C) can be obtained by extracting a signal of the highest reproduction output level from the waveform B. Then, an objective low-speed signal (waveform D) can be reproduced by time-axially decompressing the original data (waveform C) by three times.

The signal thus obtained is processed by the decryptor 412 on the basis of specific identification information in the same manner as described above, so that video information and audio information are outputted through the decryptor 2023 and the MPEG decoder 2024.

Although this embodiment has shown the case where the specific identification information processing circuit 400 is contained in the information recording/reproducing unit 300, it is a matter of course that the specific identification information processing circuit 400 may be contained in the information receiving unit 200 as described preliminarily.

Figure 23:
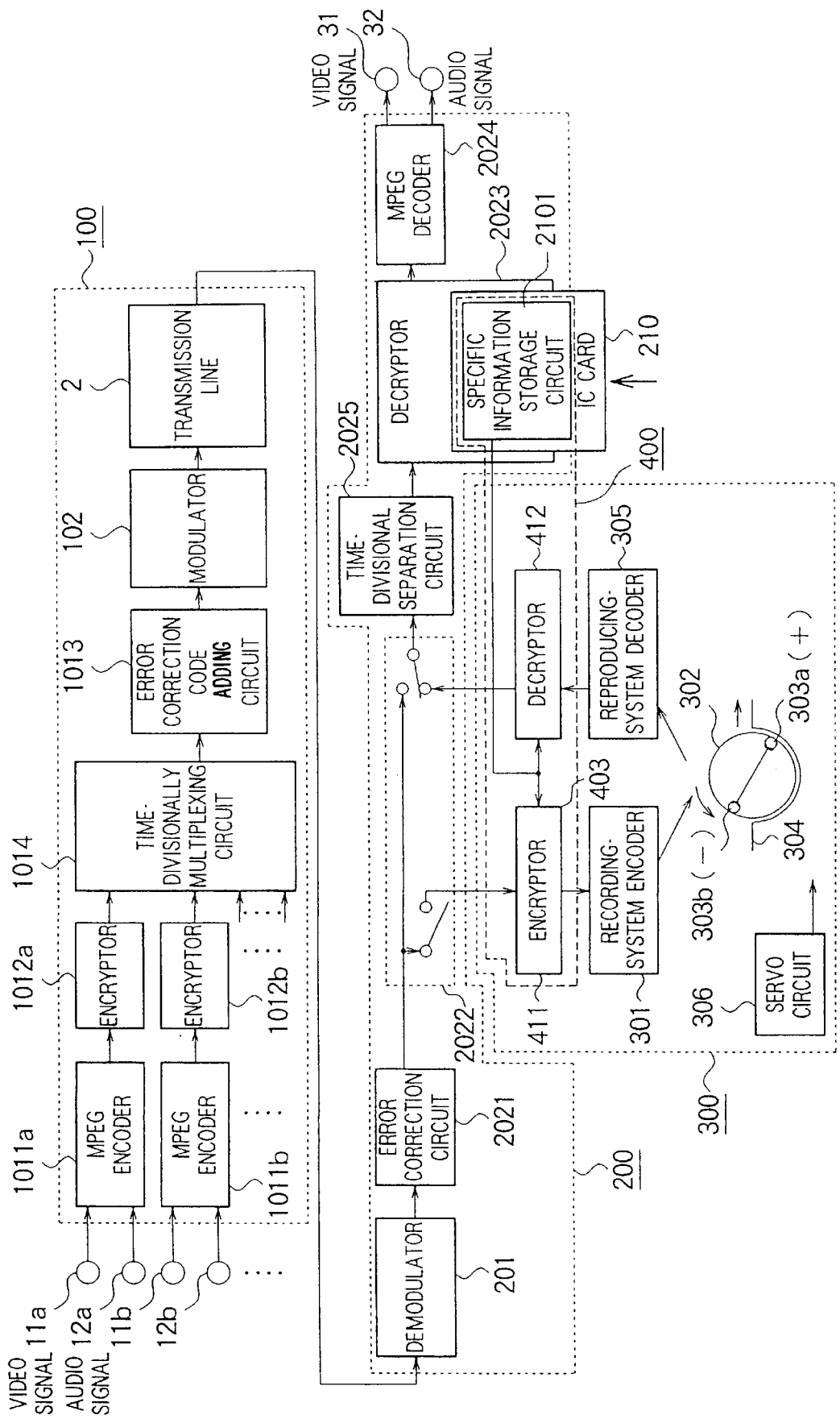
FIG. 23 is a block diagram showing a further embodiment of the present invention.

FIG. 23 is a block diagram showing a further embodiment of the information receiving and recording/reproducing apparatus according to the present invention. In FIG. 23, the reference numeral 210 designates an IC card; and 2101, a specific identification information storage circuit. This embodiment is designed so that specific identification information is obtained by inserting the IC card 210 with the specific identification information into the information receiving unit 200. In this case, reproduction of information is not limited by the information receiving unit 200 and the information recording/reproducing unit 300 but the reproduction is prohibited as long as the IC card 210 is not used.

Although the above embodiments have shown the case where the invention is applied to transmission of video/audio software information, it is to be understood that the invention is not limited thereto specifically and that the invention may be applied to transmission of digital data such as a computer program, etc. in the field of game software, or the like.

According to the aforementioned embodiments, when software information such as video information, audio information, etc. is to be transmitted by wireless or by wire and recorded/reproduced, the apparatus enabled to reproduce the recorded software information can be limited so that the copyright of the software information can be protected securely.

What is claimed is:

1. A broadcasting information receiving and recording/reproducing apparatus comprising a reception apparatus including an information receiving unit for receiving a broadcast information signal, and an information recording/reproducing unit for recording/reproducing said information signal received by said information receiving unit on/from a recording medium, wherein said reception apparatus further includes:

a specific identification information storage means for storing specific identification information;

a specific identification information adding means for adding said specific identification information to a received said information signal or encrypting the received said information signal based upon said specific identification information and to supply a resulting information signal to said information recording/reproducing unit;

a specific identification information judgement means for receiving a reproduced information signal reproduced by said information recording/reproducing unit and verifying said reproduced information signal using said specific identification information stored in said specific identification information storage means so that when a predetermined condition is satisfied, a signal obtained by deleting said specific identification information added to said received information signal or by decrypting said reproduced information signal based upon said specific identification information is outputted; and a reception-system decoder for performing a decoding process on a basis of a predetermined coding rule so that said reception-system decoder applies at least a part of said decoding process to the received said information signal to supply a partly decoded signal to said specific information adding means, and said reception-system decoder further receives said signal outputted from said specific identification information judgement means.

2. An apparatus according to claim 1, wherein said information recording/reproducing unit comprises: an encoding means for encoding, in a predetermined format, said information signal outputted from said specific identification information adding means, a magnetic head group mounted on a rotary drum and provided for recording/reproducing encoded information signal outputted from said encoding means on/from a magnetic tape, a servo means for rotating said rotary drum at a predetermined rotational speed to thereby make said magnetic tape run at a predetermined speed, and a decoding means for decoding said information signal reproduced by said magnetic head group in accordance with the predetermined format and supplying a thus decoded information signal to said specific information judgement means.

3. An apparatus according to claim 2, wherein: the broadcast said information signal is in a form of a signal which is time-compressed signal by 1/n (where n is an integer); and said information recording/reproducing unit has a servo means for reproducing recorded information at a speed which is 1/n as high as a recording speed.

4. An apparatus according to claim 1, wherein said information recording/reproducing unit has a magnetic head group mounted on a rotary drum and provided for recording/reproducing said information signal encoded in said predetermined format on/from a magnetic tape, and a servo means for rotating said rotary drum at a predetermined rotational speed at a time of recording said information signal to thereby make said magnetic tape run at a predetermined speed and for rotating said rotary drum at a speed which is m/n (where $1 \leq m \leq n$, and m and n are integers) as high as said predetermined rotational speed, at a time of reproduction of said information signal to thereby make said magnetic tape run at a speed which is 1/n as high as a recording speed.

5. An apparatus according to claim 1, further comprising:

a transmission system for transmitting said information signal, said transmission system including a transmission-system encoder for encoding said information signal based on a predetermined coding rule so that said transmission system transmits said information signal encoded by said transmission-system encoder.

6. A broadcasting information receiving method in a reception apparatus having an information receiving unit for receiving a broadcast information signal to obtain a received information signal, and an information recording/reproducing unit for recording/reproducing said received information signal on/from a recording medium, said method comprising the steps of:

storing specific identification information:

adding, by means of a specific identification information adding means, said specific identification information to said received information signal or encrypting said received information signal based upon said specific identification information to supply a resulting information signal to said information recording/reproducing unit;

receiving, by means of a specific identification information judgement means, an information signal reproduced by said information recording/reproducing unit and verifying said information signal using said specific identification information;

outputting a signal obtained by deleting said specific identification information added to said received information signal or by decrypting said decrypted information signal, when a predetermined condition is satisfied; and including a reception-system decoder for performing a decoding process on a basis of a predetermined coding rule so that said reception-system decoder applies at least part of said decoding process to said received information signal to supply a partly decoded signal to said specific information adding means, and said reception-system decoder further receiving said signal outputted from said specific information judgement means.

7. A method according to claim 6, further comprising the steps of:

transmitting, from a transmission system, said information signal obtained by encoding said information signal based on a predetermined coding rule, while said reception system decodes an encoded said information signal on a basis of said predetermined coding rule.

8. A broadcasting information receiving and recording/reproducing apparatus comprising a reception apparatus including an information receiving unit for receiving a broadcast information signal encoded on a basis of a predetermined coding rule, and an information recording/reproducing unit for recording said information signal received by said information receiving unit on/from recording medium, wherein said reception apparatus further includes:

a reception-apparatus decoder for performing a decoding process on a basis of said predetermined coding rule;

a specific identification information storage means for storing specific identification information;

a specific identification information adding means for adding said specific identification information to a received said information signal or encrypting said information signal based upon said specific identification information, to supply a resulting information signal to said information recording/reproducing unit; and a specific identification information judgement means for receiving a reproduced information signal from said information recording/reproducing unit and verifying said reproduced information signal using said specific identification information stored in said specific identification information storage means so that when a predetermined condition is satisfied, a signal obtained by deleting said specific identification information signal or by decrypting said reproduced information signal is outputted; and said reception-apparatus decoder applies at least a part of said decoding process to the received said information signal to supply a partly decoded signal to said specific identification information adding means, and said reception-system decoder further receives said signal outputted from said specific identification information judgement means.

9. A broadcasting information receiving method in a reception apparatus having an information receiving unit for receiving a broadcast information signal encoded on a basis of a predetermined coding rule, and an information recording/reproducing unit for recording/reproducing said received information signal on/from a recording medium, said method comprising the steps of:

performing, by means of a reception-apparatus decoder, a decoding process which decodes a received said information signal on a basis of said predetermined coding rule;

storing a specific identification information;

adding, by means of a specific identification information adding means, said specific identification information to the received said information signal or encrypting said information signal based upon said specific identification information to supply a resulting information signal to said information recording/reproducing unit;

receiving, by means of a specific identification information judgement means, a reproduced information signal from said information recording/reproducing unit and verifying a predetermined condition between said reproduced information signal and said specific identification information stored in said specific identification information storage means; and outputting a signal obtained by deleting said specific identification information added to said reproduced information signal or by decrypting said reproduced information signal, when said predetermined condition is satisfied; and said reception-apparatus decoder applies at least a part of said decoding process to the received said information signal to supply a partly decoded signal to said specific identification information adding means, and said reception-system decoder further receives said signal outputted from said specific identification information judgement means.

10. A broadcasting information receiving apparatus including an information receiving unit for receiving a broadcast information signal, and a reception apparatus which further includes:

a specific identification information storage means for storing specific identification information;

a specific identification information adding means for adding said specific identification information to a received said information signal or encrypting the received said information signal based upon said specific identification information, and to output a resulting information signal; and a specific identification information judgement means for being inputted a reproduced information signal and verifying said reproduced information signal using said specific identification information stored in said specific identification information storage means so that when a predetermined condition is satisfied, a signal obtained by deleting said specific identification information added to said received information signal or by decrypting said reproduced information signal is outputted; and said reception apparatus includes a reception-system decoder for performing a decoding process on a basis of a predetermined coding rule so that said reception-system decoder applies at least a part of said decoding process to said received information signal to supply a partly decoded signal to said specific identification information adding means, and said reception-system decoder further receives said signal outputted from said specific identification information judgement means.

11. A broadcasting information receiving method in a reception apparatus having an information receiving unit for receiving a broadcast information signal, said method comprising steps of:

storing specific identification information in a specific identification information storage means;

adding, by means of a specific identification information adding means, said specific identification information to a received said information signal or encrypting the received said information signal based upon said specific identification information to output a resulting information signal;

receiving, by means of a specific identification information judgement means, a reproduced information signal and verifying said reproduced information signal using said specific identification information stored in said specific identification information storage means;

outputting a signal, obtained by deleting said specific identification information from said reproduced information signal or by decrypting said reproduced information signal when a predetermined condition is satisfied; and providing a reception apparatus including a reception-system decoder for performing a decoding process on a basis of a predetermined coding rule so that said reception-system decoder applies at least a part of said decoding process to the received said information signal to supply a partly decoded signal to said specific identification information adding means, and said reception-system decoder further receiving a signal outputted from said specific identification information judgement means.

12. A broadcasting information receiving apparatus including an information receiving unit for receiving a broadcast information signal, and a reception apparatus which further includes:

a specific identification information storage means for storing specific identification information;

a specific identification information adding means for adding said specific identification information to a received said information signal or encrypting the received said information signal based upon said specific identification information, and to output a resulting information signal; and a specific identification information judgement means for being inputted an information signal and verifying said information signal using said specific identification information stored in said specific identification information storage means so that when a predetermined condition is satisfied, a signal obtained by deleting said specific identification information added to said received information signal or by decrypting an encrypted said information signal is outputted; and said reception apparatus includes a reception-system decoder for performing a decoding process on a basis of a predetermined coding rule so that said reception-system decoder applies at least a part of said decoding process to said received information signal to supply a partly decoded signal to said specific identification information adding means, and said reception-system decoder further receives said signal outputted from said specific identification information judgement means.

13. A broadcasting information receiving method in a reception apparatus having an information receiving unit for receiving a broadcast information signal, said method comprising steps of:

storing specific identification information in a specific identification information storage means;

adding, by means of a specific identification information adding means, said specific identification information to a received said information signal or encrypting the received said information signal based upon said specific identification information to output a resulting information signal;

receiving, by means of a specific identification information judgement means, an information signal and verifying said information signal using said specific identification information stored in said specific identification information storage means;

outputting a signal, obtained by deleting said specific identification information added to said received information signal or by decrypting an encrypted said information signal when a predetermined condition is satisfied; and providing a reception apparatus including a reception-system decoder for performing a decoding process on a basis of a predetermined coding rule so that said reception-system decoder applies at least a part of said decoding process to the received said information signal to supply a partly decoded signal to said specific identification information adding means, and said reception-system decoder further receiving a signal outputted from said specific identification information judgement means.

14. A broadcasting information receiving apparatus including an information receiving unit for receiving a broadcast information signal, and a reception apparatus which further includes:

a specific identification information memory which stores specific identification information;

a specific identification information adder which adds said specific identification information to a received said information signal or which encrypts the received said information signal based upon said specific identification information, and which outputs a resulting information signal; and a specific identification information judgement circuit which is inputted an information signal and which verifies said information signal using said specific identification information stored in said specific identification information memory so that when a predetermined condition is satisfied, a signal obtained by deleting said specific identification information added to said received information signal or by decrypting an encrypted said information signal is outputted; and said reception apparatus includes a reception-system decoder which performs a decoding process on a basis of a predetermined coding rule so that said reception-system decoder applies at least a part of said decoding process to said received information signal to supply a partly decoded signal to said specific identification information adder, and said reception-system decoder further receives said signal outputted from said specific identification information judgement circuit.

15. A broadcasting information receiving method in a reception apparatus having an information receiving unit for receiving a broadcast information signal, said method comprising steps of:

storing specific identification information in a specific identification information memory;

adding, using a specific identification information adder, said specific identification information to a received said information signal or encrypting the received said information signal based upon said specific identification information to output a resulting information signal;

receiving, using a specific identification information judgement circuit, an information signal and verifying said information signal using said specific identification information stored in said specific identification information memory;

outputting a signal, obtained by deleting said specific identification information added to said received information signal or by decrypting an encrypted said information signal when a predetermined condition is satisfied; and providing a reception apparatus including a reception-system decoder for performing a decoding process on a basis of a predetermined coding rule so that said reception-system decoder applies at least a part of said decoding process to the received said information signal to supply a partly decoded signal to said specific identification information adder, and said reception-system decoder further receiving a signal outputted from said specific identification information judgement circuit.

* * * * *